US012223742B2

United States Patent
Ucar et al.

(10) Patent No.: US 12,223,742 B2
(45) Date of Patent: Feb. 11, 2025

(54) SYSTEMS AND METHODS FOR DETERMINING OPERATING CRITERIA FOR PERFORMING VEHICULAR TASKS

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Chang-Heng Wang, Mountain View, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 704 days.

(21) Appl. No.: 17/161,757

(22) Filed: Jan. 29, 2021

(65) Prior Publication Data

US 2022/0245385 A1 Aug. 4, 2022

(51) Int. Cl.
 *G06V 20/56* (2022.01)
 *B60W 40/09* (2012.01)
 (Continued)

(52) U.S. Cl.
 CPC .......... *G06V 20/588* (2022.01); *B60W 40/09* (2013.01); *G06F 18/22* (2023.01); *G08G 1/0133* (2013.01);
 (Continued)

(58) Field of Classification Search
 CPC .... G05D 1/0088; G05D 1/0027; G06F 18/22; G06N 5/04
 See application file for complete search history.

(56) References Cited

U.S. PATENT DOCUMENTS 9,958,870 B1 * 5/2018 Graybill .................. G05D 1/02
10,235,263 B2 3/2019 Megahed et al.
(Continued)

FOREIGN PATENT DOCUMENTS

CN 108133076 A 6/2018
JP 2018049477 A * 3/2018
(Continued)

OTHER PUBLICATIONS

Wang et al., "Networking and Communications in Autonomous Driving: A Survey," Dec. 2018, in IEEE Communications Surveys & Tutorials, vol. 21, No. 2, pp. 1243-1274, Secondquarter 2019 (Year: 2018).*
(Continued)

*Primary Examiner* — Emily C Terrell
*Assistant Examiner* — Julia Z. Yao
(74) *Attorney, Agent, or Firm* — Dinsmore & Shohl LLP

(57) ABSTRACT

A method includes receiving first environment information related to a first vehicular task from a host vehicle, comparing the first environment information to second environment information captured when a member vehicle performed a second vehicular task corresponding to the first vehicular task using a second set of operating criteria, and determining a first set of operating criteria for performing the first vehicular task based on a similarity score between the first environment information and the second environment information and a success or accuracy rate of the second vehicular task performed by the member vehicle.

18 Claims, 8 Drawing Sheets

(51) Int. Cl.
 *G06F 18/22* (2023.01)
 *G08G 1/01* (2006.01)
(52) U.S. Cl.
 CPC ......... *G08G 1/0141* (2013.01); *G08G 1/0145* (2013.01); *B60W 2552/10* (2020.02); *B60W 2552/53* (2020.02)

(56) References Cited

U.S. PATENT DOCUMENTS

| | | | |
|---|---|---|---|
| 10,793,165 | B2 | 10/2020 | Watanabe et al. |
| 11,232,708 | B1* | 1/2022 | Fields ................ B60W 40/09 |
| 2017/0253241 | A1* | 9/2017 | Filev ................ B60W 30/18 |
| 2018/0088582 | A1* | 3/2018 | Kong ............... B60W 60/0016 |
| 2018/0105186 | A1* | 4/2018 | Motomura ........... G05D 1/0088 |
| 2018/0194280 | A1* | 7/2018 | Shibata ................ G08G 1/167 |
| 2018/0285770 | A1 | 10/2018 | Manikonda et al. |
| 2018/0297608 | A1 | 10/2018 | Willis et al. |
| 2019/0012910 | A1* | 1/2019 | Kuffner, Jr. ............ G08G 1/166 |
| 2019/0035279 | A1* | 1/2019 | Tang ................ G08G 1/0133 |
| 2019/0265712 | A1* | 8/2019 | Satzoda ............... B60W 40/09 |
| 2019/0337521 | A1* | 11/2019 | Stauber ................ B60W 40/08 |
| 2019/0382004 | A1* | 12/2019 | Golov ............... B60W 60/001 |
| 2020/0094821 | A1* | 3/2020 | Kim ................ B60W 30/0956 |
| 2020/0117185 | A1 | 4/2020 | Fu |
| 2020/0184235 | A1* | 6/2020 | Kwon ................ G06V 10/761 |
| 2020/0249683 | A1* | 8/2020 | Rosales ................ G08G 1/164 |
| 2020/0346641 | A1* | 11/2020 | Woon ................ G06V 20/58 |
| 2021/0157314 | A1* | 5/2021 | Wray ................ B60W 60/0011 |
| 2021/0173402 | A1* | 6/2021 | Chang ................ B60W 40/09 |
| 2021/0291823 | A1* | 9/2021 | Newman ............ B60W 30/095 |
| 2021/0387643 | A1* | 12/2021 | Hari ................... B60W 30/095 |

FOREIGN PATENT DOCUMENTS

| | | |
|---|---|---|
| WO | 2019109685 A1 | 6/2019 |
| WO | 2020090794 A1 | 5/2020 |

OTHER PUBLICATIONS

Miglani et al., "Deep learning models for traffic flow prediction in autonomous vehicles: A review, solutions, and challenges," Sep. 2019, Vehicular Communications, vol. 20, 2019 (Year: 2019).*

Koesdwiady et al., "Recent Trends in Driver Safety Monitoring Systems: State of the Art and Challenges," Nov. 2016, in IEEE Transactions on Vehicular Technology, vol. 66, No. 6, pp. 4550-4563, Jun. 2017 (Year: 2016).*

Furda et al., "Enabling Safe Autonomous Driving in Real-World City Traffic Using Multiple Criteria Decision Making," Apr. 2011, in IEEE Intelligent Transportation Systems Magazine, vol. 3, No. 1, pp. 4-17, Spring 2011 (Year: 2011).*

Madni et al., "Model-Based Approach for Engineering Resilient System-of-Systems: Application to Autonomous Vehicle Networks", booktitle= "Disciplinary Convergence in Systems Engineering Research," Nov. 2017, in Disciplinary Convergence in Systems Engineering Research, pp. 365-380, 2018 (Year: 2017).*

Liang et al., "Toward Intelligent Vehicular Networks: A Machine Learning Framework," in IEEE Internet of Things Journal, vol. 6, No. 1, pp. 124-135, Feb. 2019, doi: 10.1109/JIOT.2018.2872122. (Year: 2018).*

Yingfeng Cai, Xiaoqiang Sun, Hai Wang, Long Chen, and Haobin Jiang, Night-time Vehicle Detection Algorithm Based on Visual Saliency and Deep Learning, (https://www.hindawi.com/journals/js/2016/8046529/), published Nov. 20, 2016, 15 pages.

Arpad Feher, Szilard Aradi, Ferenc Hegedus, Tamas Becsi, and Peter Gaspar, Hybrid DDPG Approach for Vehicle Motion Planning, (https://www.scitepress.org/Papers/2019/79555/79555.pdf), In Proceedings of the 16th International Conference on Informatics in Control, Automation and Robotics (ICINCO 2019), pp. 422-429, 8 pages.

Jia Wu, Xiu-Yun Chen, Hao Zhang, Li-Dong Xiong, Hang Lei, and Si-Hao Deng, Hyperparameter Optimization for Machine Learning Models Based on Bayesian Optimization, (https://www.sciencedirect.com/science/article/pii/S1674862X19300047), Journal of Electronic Science and Technology, vol. 17, No. 1, Mar. 2019, 15 pages.

Xianjian Jin, Guodong Yin, and Nan Chen, Advanced Estimation Techniques for Vehicle System Dynamic State: A Survey, (https://www.ncbi.nlm.nih.gov/pmc/articles/PMC6806602/), Published Oct. 3, 2019, 36 pages.

* cited by examiner

SYSTEMS AND METHODS FOR DETERMINING OPERATING CRITERIA FOR PERFORMING VEHICULAR TASKS

TECHNICAL FIELD

The present specification generally relates to systems and methods for performing vehicular tasks and, more specifically, systems and methods for determining operating criteria including models and parameters for performing vehicular tasks based on previously performed vehicular tasks.

BACKGROUND

While operating on a road, vehicles may encounter various events in which particular vehicular tasks are to be performed. These tasks may include, for example, performing a lane change operation, performing a data download operation, and the like. Prior to performing the particular vehicular task, the vehicle selects a set of operating criteria including a model and one or more parameters. The selected operating criteria may be default criteria for the particular vehicular task. As such, the operating criteria selected does not take into consideration environment information regarding the vehicle. However, with the use of vehicular knowledge networking, the specific operating criteria selected to perform the vehicular task may be determined by examining previous results of other vehicles performing similar vehicular tasks and associated environment information present during those tasks. This allows the vehicle to determine and select operating criteria specifically based on the environment information detected by the vehicle performing the vehicular task.

Accordingly, a need exists for improved vehicle systems that determine operating criteria for performing vehicular tasks based on previously performed vehicular tasks resembling similar situations using vehicular knowledge networking.

SUMMARY

In one embodiment, a method includes receiving first environment information related to a first vehicular task from a host vehicle, comparing the first environment information to second environment information captured when a member vehicle performed a second vehicular task corresponding to the first vehicular task using a second set of operating criteria, and determining a first set of operating criteria for performing the first vehicular task based on a similarity score between the first environment information and the second environment information and a success or accuracy rate of the second vehicular task performed by the member vehicle.

In another embodiment, a server includes a controller configured to receive first environment information related to a first vehicular task from a host vehicle, compare the first environment information to second environment information captured when a member vehicle performed a second vehicular task corresponding to the first vehicular task using a second set of operating criteria, and determine a first set of operating criteria for performing the first vehicular task based on a similarity score between the first environment information and the second environment information and a success or accuracy rate of the second vehicular task performed by the member vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
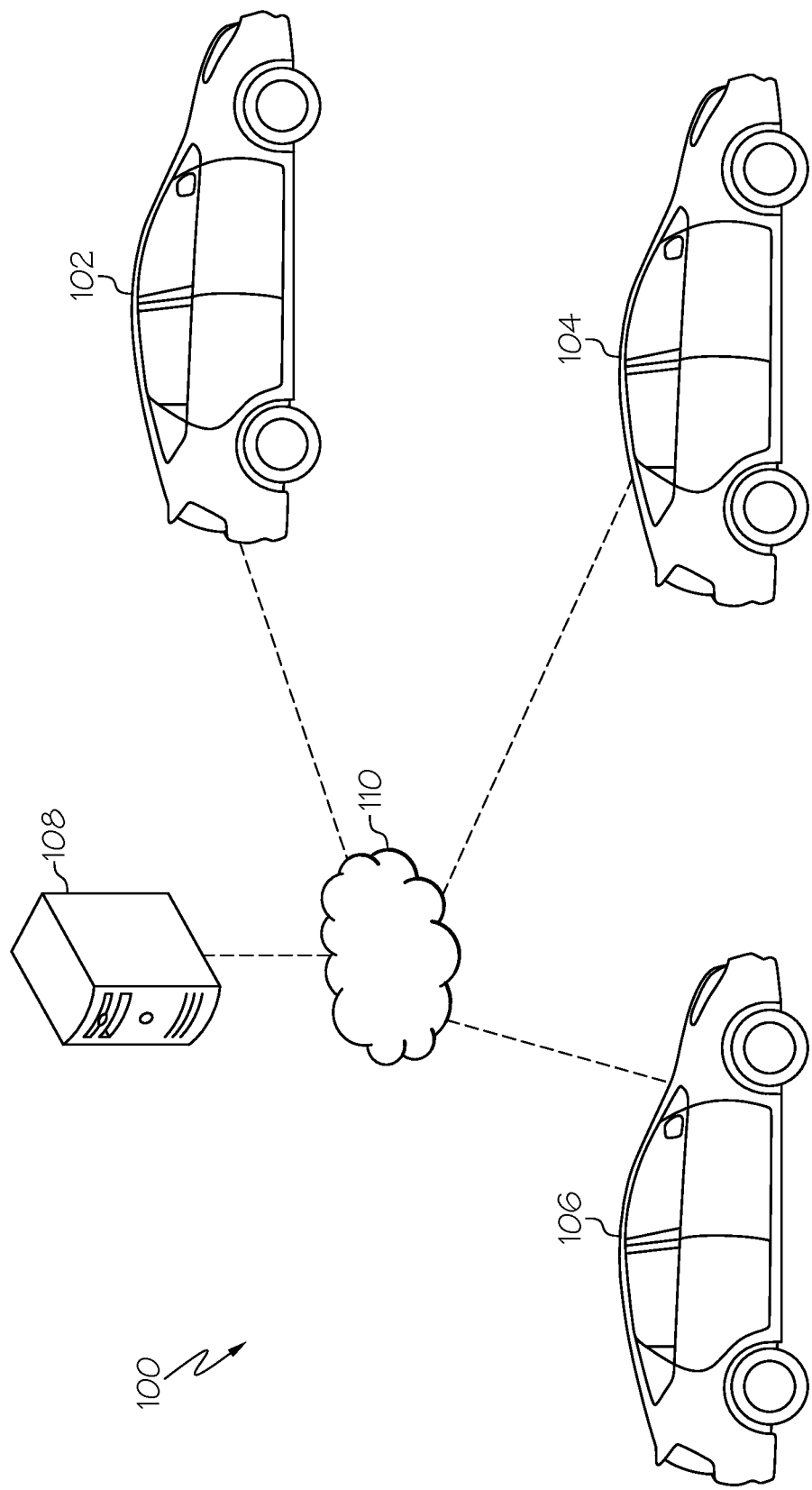
FIG. 1 schematically depicts a vehicle operating criteria system including a host vehicle and a plurality of member vehicles in communication with a server, according to one or more embodiments shown and described herein.

Embodiments described herein are directed to a vehicle operating criteria systems and methods for determining a set of operating criteria for performing a vehicular task based on similar, previously performed vehicular tasks.

The methods include receiving first environment information related to a first vehicular task from a host vehicle, comparing the first environment information to second environment information captured when a member vehicle performed a second vehicular task corresponding to the first vehicular task using a second set of operating criteria, and determining a first set of operating criteria for performing the first vehicular task based on a similarity score between the first environment information and the second environment information and a success or accuracy rate of the second vehicular task performed by the member vehicle.

In response to determining the first set of operating criteria based on a similarity score and a success or accuracy rate, the host vehicle is capable of utilizing operating criteria that has provided positive results in previous, similar instances. Thus, the host vehicle is able to preemptively use operating criteria for the specific instance by relying on vehicular knowledge networking. Various embodiments of the systems and methods are described in more detail herein. Whenever possible, the same reference numerals will be used throughout the drawings to refer to the same or like parts.

Referring now to FIG. 1, an operating criteria system 100 is shown generally including a host vehicle 102 and one or more member vehicles, such as a first member vehicle 104 and a second member vehicle 106. The first member vehicle 104 and the second member vehicle 106 may be collectively referred to herein as the member vehicles 104, 106. While FIG. 1 illustrates two member vehicles 104, 106, it should be appreciated that the operating criteria system 100 may include more or less than two member vehicles 104, 106. The host vehicle 102 and the member vehicles 104, 106 may communicate with a server 108 of the operating criteria system 100 via a network 110. The server 108 may be a remote server such as a cloud or edge server. In some embodiments, the server 108 may be a local server including, but not limited to, a roadside unit, an edge server, and the like. It should be appreciated that the host vehicle 102 and the member vehicles 104, 106 are each preregistered with the server 108 such that data may be transmitted to the server 108 from the host vehicle 102 and the member vehicles 104, 106. Similarly, as discussed herein, the host vehicle 102 is capable of receiving data from the server 108, which was previously transmitted by the member vehicles 104, 106.

Each of the host vehicle 102 and the member vehicles 104, 106 may be a vehicle including an automobile or any other passenger or non-passenger vehicle such as, for example, a terrestrial, aquatic, and/or airborne vehicle. In some embodiment, one or more of the host vehicle 102 and the member vehicles 104, 106 may be an unmanned aerial vehicle (UAV), commonly known as a drone.

The server 108 may communicate with vehicles in an area covered by the server 108. The server 108 may communicate with other servers that cover different areas. The server 108 may communicate with a remote server and transmit information collected by the server 108 to the remote server.

Figure 2:
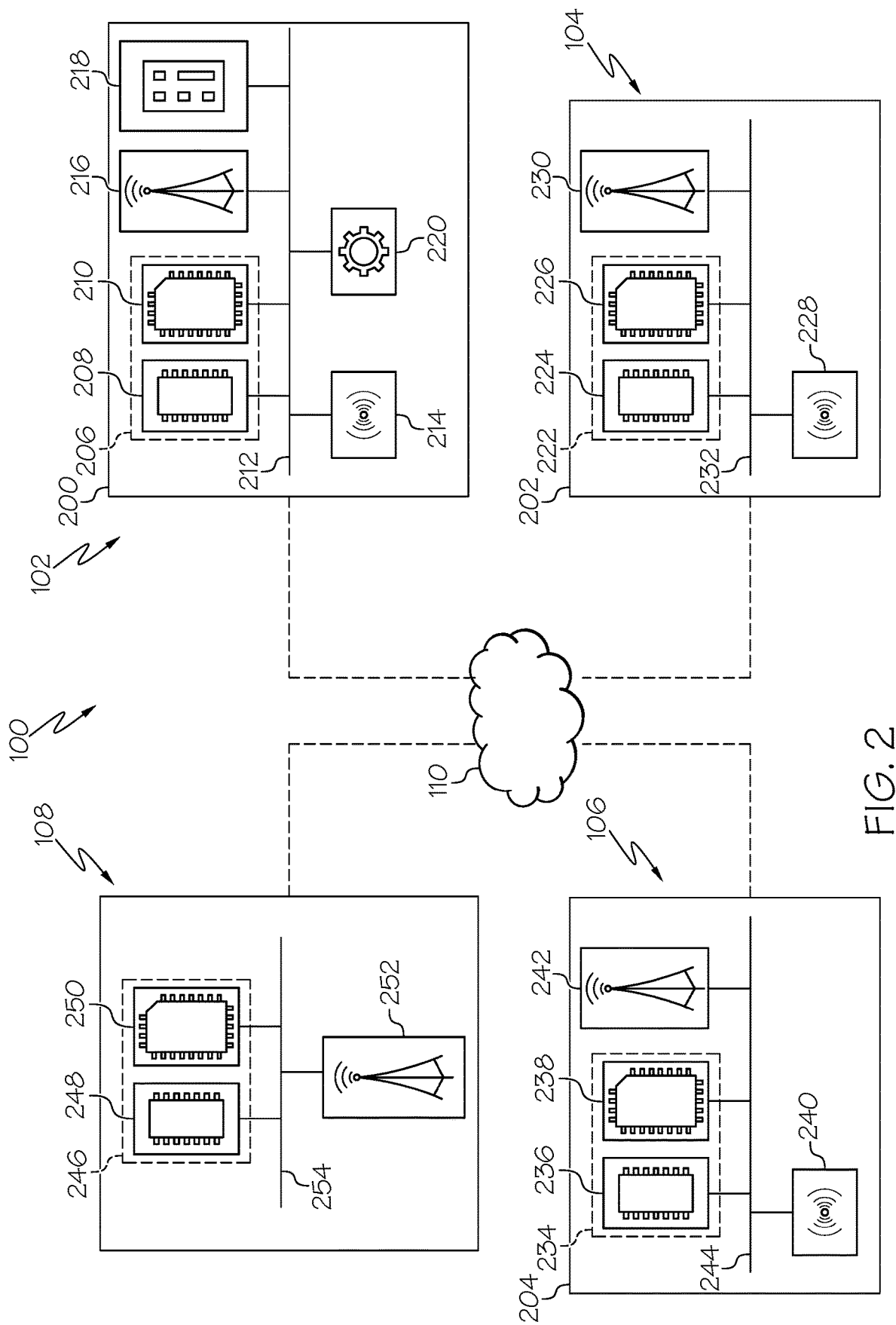
FIG. 2 schematically depicts a server system, of the vehicle operating criteria system communicating with a host vehicle system and a plurality of member vehicle systems, according to one or more embodiments shown and described herein.

FIG. 2 depicts a schematic diagram of the operating criteria system 100 including a host vehicle system 200, a first member vehicle system 202, a second member vehicle system 204, the server 108, and the network 110, according to one or more embodiments shown and described herein. It is noted that, while the host vehicle system 200, the first member vehicle system 202, and the second member vehicle system 204 are depicted in isolation, each of the host vehicle system 200, the first member vehicle system 202, and the second member vehicle system 204 may be included within a vehicle, for example, within the host vehicle 102, the first member vehicle 104, and the second member vehicle 106 of FIG. 1, respectively. The first member vehicle system 202 and the second member vehicle system 204 may be collectively referred to herein as the member vehicle systems 202, 204. Further, it should be appreciated that while only two member vehicle systems 202, 204 are illustrated, the operating criteria system 100 may include any number of member vehicle systems based on the number of member vehicles present or in communication, either currently or previously, with the server 108.

The host vehicle system 200 includes a controller 206 including one or more processors 208 and one or more memory modules 210. Each of the one or more processors 208 may be any device capable of executing machine readable and executable instructions. Accordingly, each of the one or more processors 208 may an integrated circuit, a microchip, a computer, or any other computing device. The one or more processors 208 are coupled to a communication path 212 that provides signal interconnectivity between various modules of the host vehicle system 200. Accordingly, the communication path 212 may communicatively couple any number of processors 208 with one another, and allow the modules coupled to the communication path 212 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 212 may be formed from any medium that is capable of transmitting a signal such as, for example, conductive wires, conductive traces, optical waveguides, or the like. In some embodiments, the communication path 212 may facilitate the transmission of wireless signals, such as WiFi, Bluetooth®, Near Field Communication (NFC) and the like. Moreover, the communication path 212 may be formed from a combination of mediums capable of transmitting signals. In one embodiment, the communication path 212 comprises a combination of conductive traces, conductive wires, connectors, and buses that cooperate to permit the transmission of electrical data signals to components such as processors, memories, sensors, input devices, output devices, and communication devices. Accordingly, the communication path 212 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As noted above, the host vehicle system 200 includes one or more memory modules 210 coupled to the communication path 212. The one or more memory modules 210 may comprise RAM, ROM, flash memories, hard drives, or any device capable of storing machine readable and executable instructions such that the machine readable and executable instructions can be accessed by the one or more processors 208. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 210. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 210 may include machine readable instructions that, when executed by the one or more processors 208, cause the host vehicle system 200 to capture environment information using one or more sensors 214. As used herein, environment information captured by one or more sensors 214 of the host vehicle 102 may be referred to as first environment information. The environment information may include data regarding nearby or surrounding objects (e.g., vehicles) such as, a location, position, moving speed or direction, and the like of any surrounding objects. The environment information may also include data specific to the host vehicle 102 itself such as, for example, a location, driving speed, a driving direction of the host vehicle 102, a position of the host vehicle 102 relative to surrounding objects, a direction of a gaze of a driver of the host vehicle 102, activity occurring within the host vehicle 102, such as use of electronic devices and data being downloaded by the electronic devices, and the like. It should be appreciated that the environment information collected at the host vehicle 102 is not limited to the above examples identified herein.

Referring still to FIG. 2, the host vehicle system 200 comprises one or more sensors 214. In embodiments, the one or more sensors 214 may be any device having an array of sensing devices capable of detecting radiation in an ultraviolet wavelength band, a visible light wavelength band, or an infrared wavelength band. The one or more sensors 214 may have any resolution. In some embodiments, one or more optical components, such as a mirror, fish-eye lens, or any other type of lens may be optically coupled to the one or more sensors 214. In embodiments described herein, the one or more sensors 214 may provide environment information, as discussed herein, to the one or more processors 208 or another component communicatively coupled to the communication path 212. In some embodiments, the one or more sensors 214 may also be configured to capture sound data and provide the sound data to the one or more processors 208 or another component communicatively coupled to the communication path 212.

In some embodiments, the one or more sensors 214 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein. Ranging sensors like radar may be used to obtain a rough depth and speed information of an object. The one or more sensors 214 may be positioned to detect environment information of objects exterior of the host vehicle 102 and/or environment information of objects within the host vehicle 102, such as the driver or an occupant of the host vehicle 102, as well as use of devices within the host vehicle 102. In embodiments, the one or more sensors 214 may also be configured to detect a location, a driving direction, and/or a driving speed of the host vehicle 102.

Still referring to FIG. 2, the host vehicle system 200 comprises network interface hardware 216 for communicatively coupling the host vehicle system 200 to the server 108. The network interface hardware 216 can be communicatively coupled to the communication path 212 and can be any device capable of transmitting and/or receiving data via the network 110. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the host vehicle system 200 may transmit its data to the server 108. For example, the network interface hardware 216 of the host vehicle system 200 may transmit the captured first environment information, including data pertaining to the host vehicle 102 and surrounding objects generated by the host vehicle system 200 to the server 108.

Still referring to FIG. 2, the host vehicle system 200 may be communicatively coupled to the server 108 by the network 110. In one embodiment, the network 110 may include one or more computer networks (e.g., a personal area network, a local area network, or a wide area network), cellular networks, satellite networks and/or a global positioning system and combinations thereof. Accordingly, the host vehicle system 200 can be communicatively coupled to the network 110 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

The host vehicle system 200 also includes a user interface 218 communicatively coupled to the other components of the host vehicle system 200 via the communication path 212. The user interface 218 may include one or more controls for selecting the vehicular task to be performed by the host vehicle 102. As used herein, the vehicular task to be performed by the host vehicle 102 may be referred to as a first vehicular task. In embodiments, the first vehicular task may include, for example, a lane change operation, a data download operation, a traffic density estimation operation, a driver status estimation operation, and the like. The first vehicular task may be selected by operating the one or more controls to input and/or select the vehicular task. The one or more controls may be any suitable user operating controls such as, for example, buttons or tactile input on a touch-screen device. In response to selecting the vehicular task, the environment information captured by the one or more sensors 214, as well as the instruction to perform the particular vehicular task are transmitted to the server 108 via the network 110 to identify a first set operating criteria which the host vehicle 102 should utilize when executing the first vehicular task.

The host vehicle system 200 also includes a criteria executing device 220 for adjusting settings of the host vehicle 102 in accordance with the first set of operating criteria to execute the first vehicular task. The criteria executing device 220 is communicatively coupled to the other components of the host vehicle system 200 via the communication path 212. As discussed in more detail herein, the first set of operating criteria may be determined by the server 108 and accepted by the host vehicle system 200 for carrying out the first vehicular task. In embodiments, the first set of operating criteria may include a model for performing the first vehicular task, and one or more parameters related to objects identified in the environment information processed prior to performing the first vehicular task.

Still referring to FIG. 2, the first member vehicle system 202 includes a controller 222 including one or more processors 224 and one or more memory modules 226, one or more sensors 228, network interface hardware 230, and a communication path 232 communicatively connected to the other components of the first member vehicle system 202. The components of the first member vehicle system 202 may be structurally similar to and have similar functions as the corresponding components of the host vehicle system 200 (e.g., the one or more processors 224 corresponds to the one or more processors 208, the one or more memory modules 226 corresponds to the one or more memory modules 210, the one or more sensors 228 corresponds to the one or more sensors 214, the network interface hardware 230 corresponds to the network interface hardware 216, and the communication path 232 corresponds to the communication path 212). The one or more memory modules 226 may include one or more neural networks. The one or more sensors 228 of the first member vehicle system 202 are configured to detect second environment information. The first member vehicle 104 utilizes a second set of operating criteria when performing a second vehicular task.

Still referring to FIG. 2, the second member vehicle system 204 includes a controller 234 including one or more processors 236 and one or more memory modules 238, one or more sensors 240, network interface hardware 242, and a communication path 244 communicatively connected to the other components of the second member vehicle system 204. The components of the second member vehicle system 204 may be structurally similar to and have similar functions as the corresponding components of the host vehicle system 200 (e.g., the one or more processors 236 corresponds to the one or more processors 208, the one or more memory modules 238 corresponds to the one or more memory modules 210, the one or more sensors 240 corresponds to the one or more sensors 214, the network interface hardware 242 corresponds to the network interface hardware 216, and the communication path 244 corresponds to the communication path 212). The one or more memory modules 238 may include one or more neural networks. The one or more sensors 240 of the second member vehicle system 204 are configured to detect third environment information. The second member vehicle 106 utilizes a third set of operating criteria when performing a third vehicular task.

Still referring to FIG. 2, the server 108 includes a controller 246 including one or more processors 248 and one or more memory modules 250, network interface hardware 252, and a communication path 254. The components of the server 108 may be structurally similar to and have similar functions as the corresponding components of the host vehicle system 200 (e.g., the one or more processors 248 corresponds to the one or more processors 208, the one or more memory modules 250 corresponds to the one or more memory modules 210, the network interface hardware 252 corresponds to the network interface hardware 216, and the communication path 254 corresponds to the communication path 212).

Figure 3:
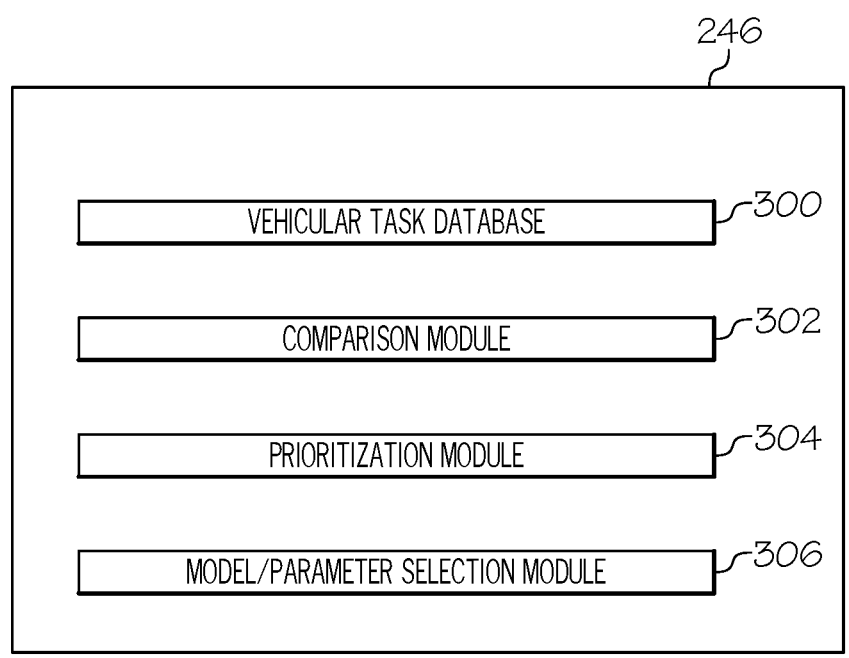
FIG. 3 schematically depicts a controller of the server system, according to one or more embodiments shown and described herein.

Referring now to FIG. 3, the controller 246 of the server 108 is shown. In embodiments, the controller 246 generally includes a vehicular task database 300, a comparison module 302, a prioritization module 304, and a model/parameter selection module 306.

The vehicular task database 300 stores data relating to previously executed vehicular tasks performed by other vehicles such as, for example, the first member vehicle 104 and the second member vehicle 106. For example, the data stored in the vehicular task database 300 includes the second vehicular task and the third vehicular task previously performed by the first member vehicle 104 and the second member vehicle 106, respectively, corresponding sets of operating criteria that was utilized when executing each of the vehicular tasks, and environment information captured by the member vehicles 104, 106 at the time the vehicular tasks were performed. In addition, the vehicular task database 300 includes a success or accuracy rate for each particular vehicular task performed. The success or accuracy rate may be determined by each member vehicle 104, 106 once the vehicular task is completed by comparing an anticipated outcome of the vehicular task with an actual outcome of the vehicular task. As a non-limiting example, during a lane change operation, if a member vehicle moves within a threshold distance of surrounding object (e.g. a vehicle) while changing lanes, this will lower the success or accuracy rate associated with the vehicular task for that member vehicle. As another non-limiting example, during a data download operation, if actual download speeds are less than a predicted download speed, this will also lower the success or accuracy rate associated with the particular vehicular task for that member vehicle.

Referring still to FIG. 3, the comparison module 302 compares the environment data stored within the vehicular task database 300 to the first environment data received from the host vehicle 102 when the first vehicular task is requested to be performed, such as by operating the user interface 218. Specifically, the comparison module 302 compares environment information previously stored within the vehicular task database 300, such as the second environment information captured by the first member vehicle 104 and the third environment information captured by the second member vehicle 106, to determine a similarity score with respect to the first environment information. In embodiments, the comparison module 302 identifies one or more previously performed vehicular tasks stored in the vehicular task database 300 that has at least a threshold similarity score with the vehicular task received from the host vehicle 102. As a non-limiting example, if the vehicular task is a lane change operation, the similarity score may be based on the location and/or speed of surrounding objects prior to performing the vehicular task. As another non-limiting example, if the vehicular task is a data download operation, the similarity score may be based on a location of the host vehicle 102 compared to a location of each member vehicle 104, 106, the number of vehicles proximate to each member vehicles 104, 106 and the host vehicle 102, as well as an operational state of electronic components within the host vehicle 102 and the member vehicle 104, 106.

The prioritization module 304 assigns a candidate score to those vehicular tasks that the comparison module 302 determines to have a similarity score exceeding the threshold similarity score. In embodiments, the vehicular task having the highest candidate score is utilized for determining the first set of operating criteria for the host vehicle 102 in performing the first vehicular task. In embodiments, the prioritization module 304 assigns a greater candidate score to the vehicular task having the greatest similarity score. In other embodiments, the prioritization module 304 assigns a greater candidate score to the vehicular task having the greatest success or accuracy rate. In other embodiments, the similarity score and the success or accuracy rate may each be weighted differently to result in a candidate score that favors either a greater similarity score or a greater success or accuracy rate. Additionally, in embodiments, the candidate score may be assigned based on a user profile of the host vehicle 102. For example, the user profile of the host vehicle 102 may indicate one or more preferences such that a vehicular task performed using a specific set of operating criteria may receive a greater candidate score than a vehicular task using a different set of operating criteria. In addition to assigning a candidate score, in embodiments, the prioritization module 304 transmits a signal to the host vehicle 102 to not utilize a specific set of operating criteria when the similarity score and/or the success/accurate rate of the vehicular task is below a specific threshold. This is to prevent the host vehicle 102 from utilizing a particular set of operating criteria that has proven to provide poor results in a similar previous instance.

The model/parameter selection module 306 identifies which of the previously performed vehicular tasks stored within the vehicular task database 300 are assigned the greatest candidate score. The vehicular task having the greatest candidate score is transmitted to the host vehicle 102 to identify the first set of operating criteria, including a model and/or one or more parameters that the host vehicle 102 should utilize when performing the first vehicular task. In embodiments, the model/parameter selection module 306 may identify one vehicular task, and specifically one set of operating criteria, to be transmitted to the host vehicle 102. In other embodiments, the model/parameter selection module 306 may identify more than one set of operating criteria that the host vehicle 102 should utilize when performing the first vehicular task. For example, the model/parameter selection module 306 may identify two or more vehicular tasks when the candidate score of each vehicular task is above a threshold candidate score. Alternatively, or in addition, the model/parameter selection module 306 may identify two or more vehicular tasks when the candidate score of each vehicular task is the same. In embodiments, the model/parameter selection module 306 transmits a signal to the host vehicle 102 to not utilize a specific set of operating criteria when the similarity score and/or the success/accurate rate of the vehicular task is below a specific threshold. This is to prevent the host vehicle 102 from utilizing a particular set of operating criteria that has proven to provide poor results in a similar previous instance. In embodiments, the model/parameter selection module 306 includes an inferring mechanism for determining an inference and/or a rationale as to why the one or more sets of operating criteria may be successful. Further, the inferring mechanism may similarly determine an interference and/or a rationale as to why one or more non-selected sets of operating criteria may be unsuccessful. The inferring mechanism may utilize machine learning or cause and effect analysis by comparing previously stored vehicular task scenarios, i.e., utilizing the vehicular knowledge networking, to determine the inference and the rationale.

Figure 4:
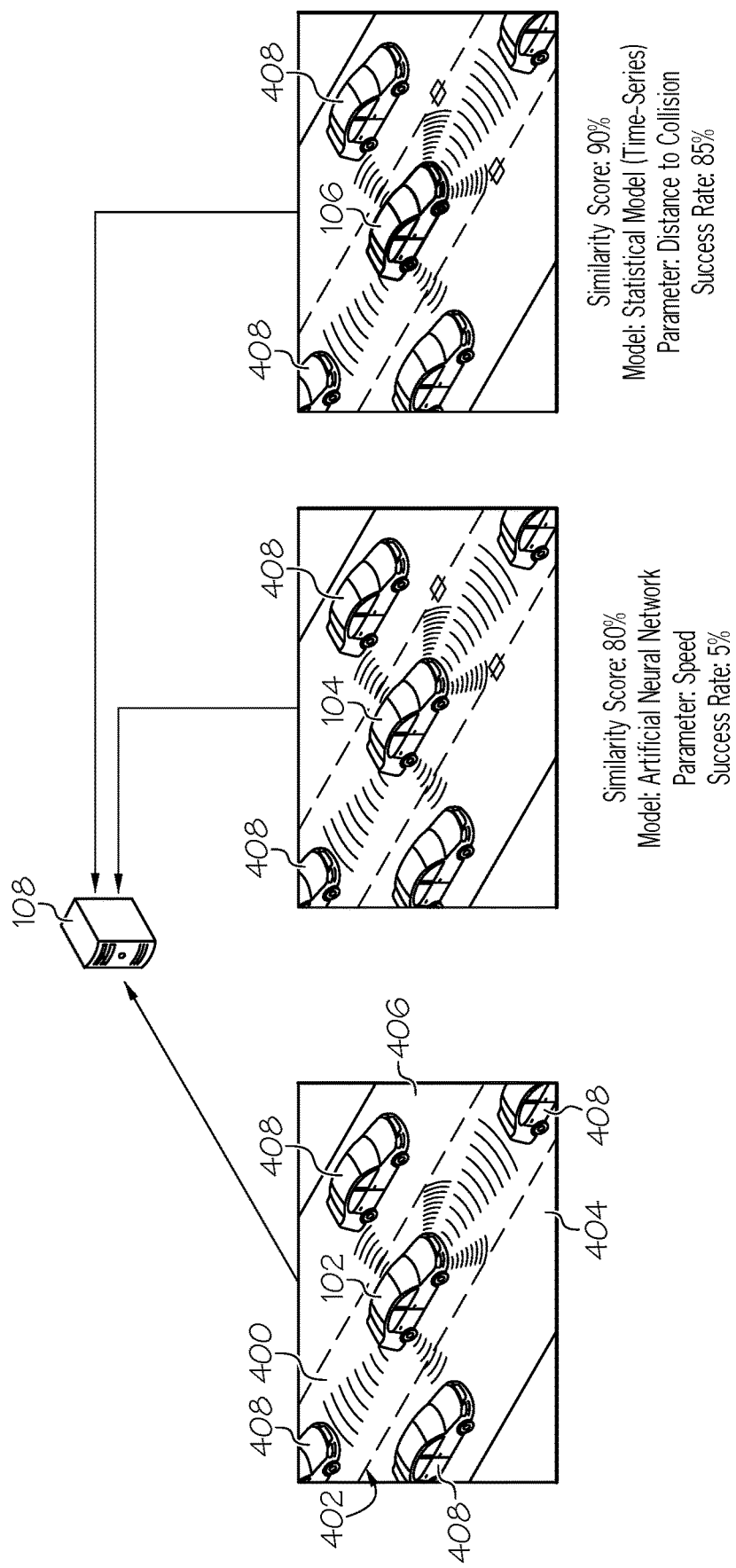
FIG. 4 schematically depicts an illustrative example of the host vehicle determining operating criteria for performing a lane change operation, according to one or more embodiments shown and described herein.

Referring now to FIG. 4, an illustrative example of a vehicular task, specifically a lane change operation, being performed and determining a first set of operating criteria is illustrated. Here, the host vehicle 102 is illustrated as driving in a center lane 400 of a roadway 402 and decides to perform a lane change operation, such as switching into a left lane 404 or a right lane 406 of the roadway 402. The indication of performing the first vehicular task, i.e., the lane change operation, may be initiated by manual operation such as, for example, operating controls of the user interface 218 (FIG. 2) or activating a turn signal. In some embodiments, the host vehicle 102 may be an autonomous vehicle, and transmit its intention to change lanes to the server 108. Upon indicating the first vehicular task to be performed, the host vehicle 102 transmits first environment information captured by the one or more sensors 214 (FIG. 2) to the server 108. In this particular instance, the first environment information may include data of surrounding objects (e.g., vehicles 408) such as, for example, location, speed, selfishness/altruism characteristics, and the like. Upon transmitting the first environment information to the server 108, the server 108 identifies similar instances of member vehicles performing a similar vehicular task to identify the first set of operating criteria that the host vehicle 102 should utilize when initiating the first vehicular task.

As shown in FIG. 4, the server 108 identifies two similar instances in which the first member vehicle 104 and the second member vehicle 106 previously performed a lane change operation. The server 108 stores first and second environment information, operating criteria, including the model and the one or more parameters, and the success or accuracy rate of each of the second and third vehicular tasks performed by the first member vehicle 104 and the second member vehicle 106, respectively. In the specific example illustrated in FIG. 4, the first member vehicle 104 used an artificial neural network as the model, speed as the parameter, and an individual prediction method and resulted in a success rate of 5%. By comparing the first environment information captured by the host vehicle 102 and the second environment information captured by the first member vehicle 104, the server 108 determines that the similarity score is 80%. Further, the second member vehicle 106 used a statistical (time-series) model as the model, distance to collision as the parameter, and a collaborative prediction method, e.g., by forming a vehicular micro cloud with vehicles proximate to the second member vehicle 106, and resulted in a success rate of 85%. By comparing the first environment information captured by the host vehicle 102 and the third environment information captured by the second member vehicle 106, the server 108 determines that the similarity score is 90%. Therefore, after applying a weighted formula to the similarity score and the success rate of the vehicular tasks performed by the first member vehicle 104 and the second member vehicle 106, the server 108 may determine that the host vehicle 102 should utilize a statistical (time-series) model as the model, distance to collision as the parameter, and a collaborative prediction method by forming a vehicular micro cloud proximate to the host vehicle 102. In addition, the server 108 may determine that the host vehicle 102 should not utilize the artificial neural network for the lane changing task under the current environment. Alternatively, if the host vehicle 102 utilizes an artificial neural network as the model, the server 108 may determine that the host vehicle 102 should not use speed as the parameter. As used herein, the term "vehicular micro cloud" refers to a cluster of connected vehicles in which the vehicles may collaboratively perform computation, data storage, sensing, communication tasks, and any combination thereof among one another over vehicle-to-vehicle (V2V) networks. The use of vehicular micro clouds removes the need for connected vehicles to access remote cloud servers or edge servers by vehicle-to-network (V2N) communications (e.g., by cellular networks) whenever they need to get access to computing resources such as shared data (e.g., high-definition road map for automated driving), shared computational power, and cloudification services.

Figure 5:
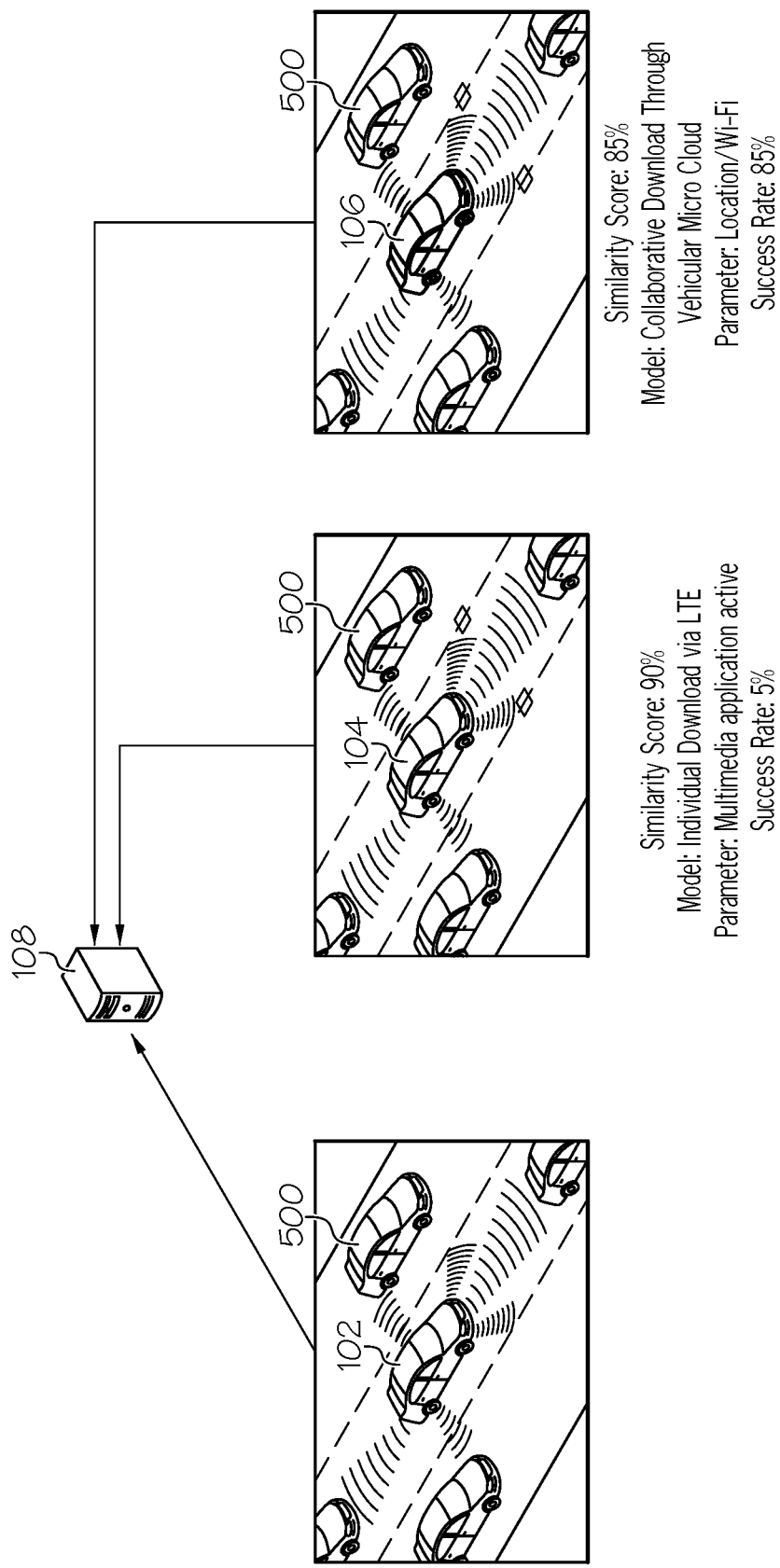
FIG. 5 schematically depicts an illustrative example of the host vehicle determining operating criteria for performing a data download operation, according to one or more embodiments shown and described herein.

Referring now to FIG. 5, another illustrative example of a vehicular task, specifically, a data download operation, being performed and determining a first set of operating criteria is illustrated. Upon indicating the first vehicular task to be performed, such as by operating the user interface 218

(FIG. 2), the host vehicle 102 transmits first environment information captured by the one or more sensors 214 (FIG. 2) to the server 108. In this particular instance, the first environment information may include data of surrounding objects (e.g., vehicles 500), location and speed of the host vehicle 102 itself, and the like captured by the one or more sensors 214. Further, the data may include activity of electronic devices and network components within the host vehicle 102 such as current bandwidth being utilized by the devices and components of the host vehicle 102. Upon transmitting the first environment information to the server 108, the server 108 identifies similar instances of member vehicles performing a similar vehicular task to identify the first set of operating criteria that the host vehicle 102 should utilize when initiating the first vehicular task.

As shown in FIG. 5, the server 108 identifies two similar instances in which the first member vehicle 104 and a second member vehicle 106 previously performed a data download operation. Specifically, the first member vehicle 104 used individual download via LTE as the model, active multimedia applications as the parameter, and resulted in a success rate of 5%. By comparing the first environment information captured by the host vehicle 102 and the second environment information captured by the first member vehicle 104, the server 108 determines that the similarity score is 90%. Further, the second member vehicle 106 used a collaborative download through vehicular micro cloud as the model, location and Wi-Fi as the parameters, and resulted in a success rate of 85%. By comparing the first environment information captured by the host vehicle 102 and the third environment information captured by the second member vehicle 106, the server 108 determines that the similarity score is 85%. Therefore, after applying a weighted formula to the similarity score and the success rate of the vehicular tasks performed by the first member vehicle 104 and the second member vehicle 106, the server 108 may determine that the host vehicle 102 should utilize collaborative download through vehicular micro cloud as the model, and location and Wi-Fi as the parameters. In addition, the server 108 may determine that if the host vehicle 102 utilizes individual download via LTE as the model, the host vehicle 102 should not permit multimedia applications to remain active.

Figure 6:
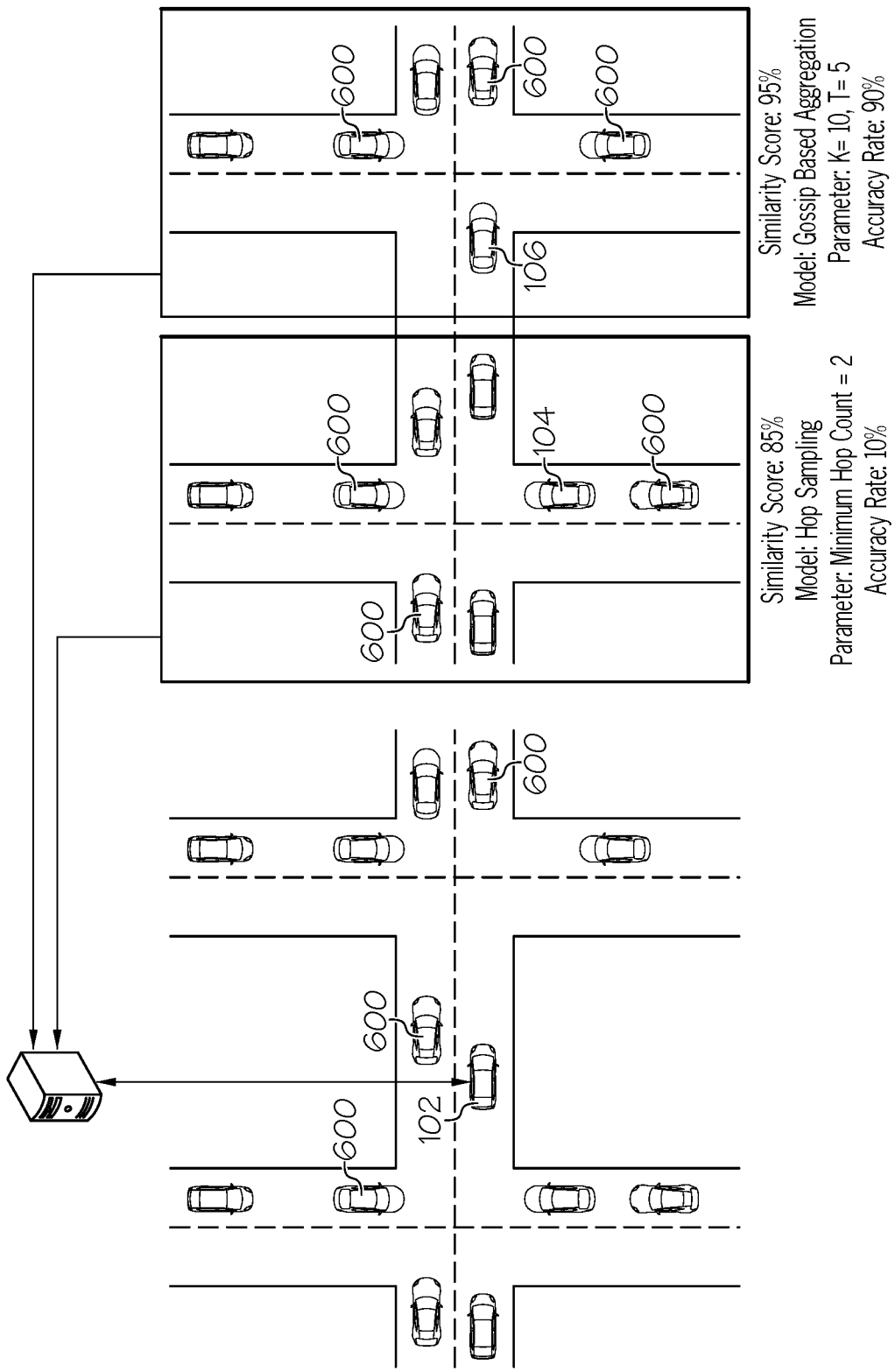
FIG. 6 schematically depicts an illustrative example of the host vehicle determining operating criteria for performing a traffic density estimation operation, according to one or more embodiments shown and described herein.

Referring now to FIG. 6, another illustrative example of a vehicular task, specifically a traffic density estimation operation, being performed and determining a first set of operating criteria is illustrated. Upon indicating the first vehicular task to be performed, such as by operating the user interface 218 (FIG. 2), the host vehicle 102 transmits first environment information captured by the one or more sensors 214 (FIG. 2) to the server 108. In this particular instance, the first environment information may include data of surrounding objects (e.g., vehicles 600) captured by the one or more sensors 214. Upon transmitting the first environment information to the server 108, the server 108 identifies similar instances of member vehicles performing a similar vehicular task to identify the first set of operating criteria that the host vehicle 102 should utilize when initiating the first vehicular task.

As shown in FIG. 6, the server 108 identifies two similar instances in which the first member vehicle 104 and a second member vehicle 106 previously performed a traffic density estimation operation. Specifically, the first member vehicle 104 used hop sampling as the model, a minimum hop count of 2 as the parameter, and resulted in an accuracy rate of 10%. By comparing the first environment information captured by the host vehicle 102 and the second environment information captured by the first member vehicle 104, the server 108 determines that the similarity score is 85%. Further, the second member vehicle 106 used gossip based aggregation as the model, K=10 and T=5 as the parameters, and resulted in a success rate of 90%. By comparing the first environment information captured by the host vehicle 102 and the third environment information captured by the second member vehicle 106, the server 108 determines that the similarity score is 95%. Therefore, after applying a weighted formula to the similarity score and the success rate of the vehicular tasks performed by the first member vehicle 104 and the second member vehicle 106, the server 108 may determine that the host vehicle 102 should utilize gossip based aggregation as the model, and K=10 and T=5 as the parameters. Alternatively, the server 108 may determine that if the host vehicle 102 utilizes hop sampling as the model, the host vehicle 102 should not use a minimum hop count of 2 as the parameter.

Figure 7:
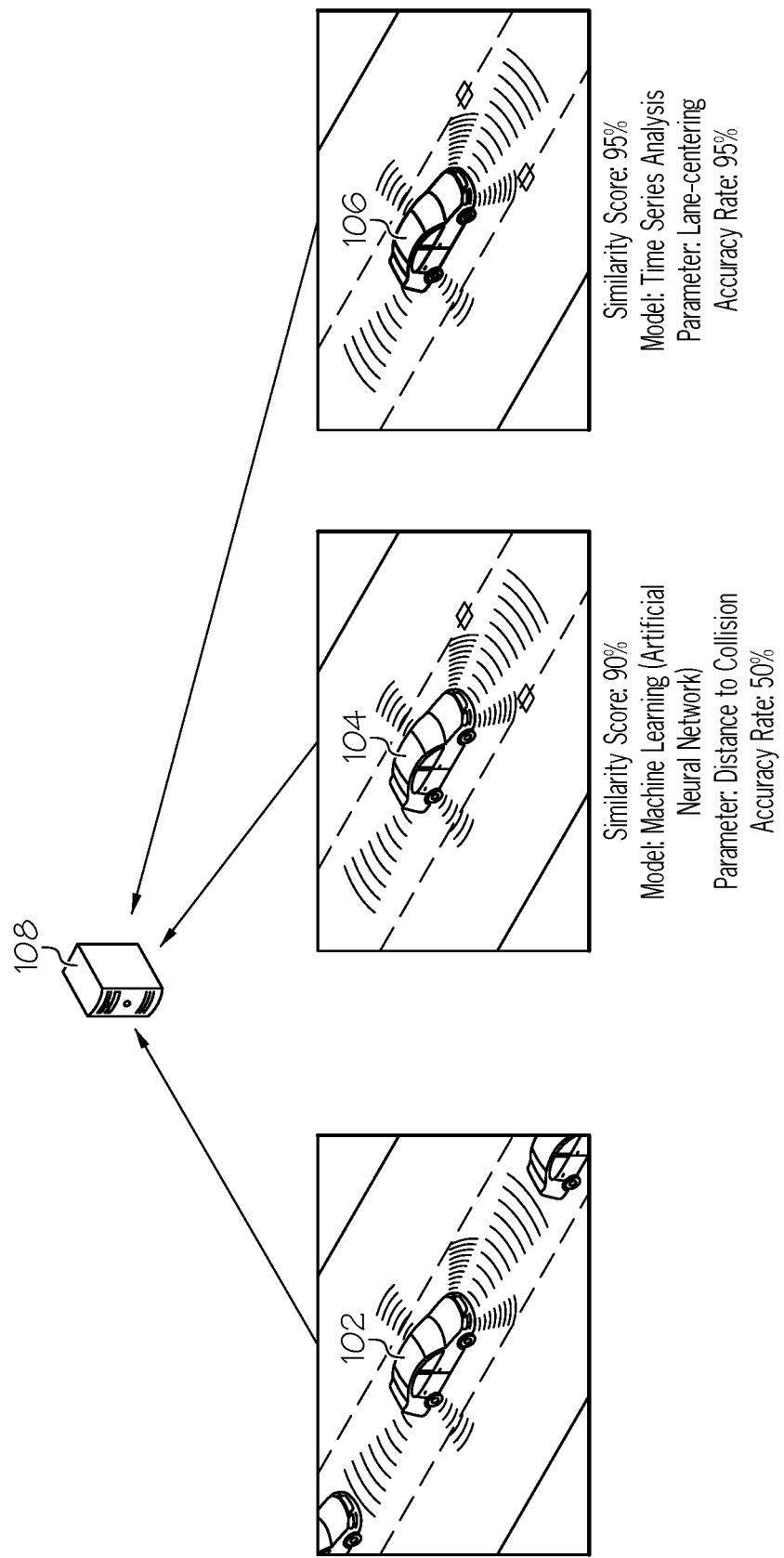
FIG. 7 schematically depicts an illustrative example of the host vehicle determining operating criteria for performing a driver status estimation operation, according to one or more embodiments shown and described herein.

Referring now to FIG. 7, another illustrative example of a vehicular task, specifically a driver status estimation operation, being performed and determining a first set of operating criteria is illustrated. Upon indicating the first vehicular task to be performed, such as by operating the user interface 218 (FIG. 2), the host vehicle 102 transmits first environment information captured by the one or more sensors 214 (FIG. 2) to the server 108. In this particular instance, the first environment information may include data regarding a gaze of the driver, use of electronic devices within the host vehicle 102, and the like captured by the one or more sensors 214. Upon transmitting the first environment information to the server 108, the server 108 identifies similar instances of member vehicles performing a similar vehicular task to identify the first set of operating criteria that the host vehicle 102 should utilize when initiating the first vehicular task.

As shown in FIG. 7, the server 108 identifies two similar instances in which the first member vehicle 104 and a second member vehicle 106 previously performed a driver status estimation operation. Specifically, the first member vehicle 104 used machine learning (artificial neural network) as the model, a distance to collision as the parameter, and resulted in an accuracy rate of 50%. By comparing the first environment information captured by the host vehicle 102 and the second environment information captured by the first member vehicle 104, the server 108 determines that the similarity score is 90%. Further, the second member vehicle 106 used time series analysis as the model, lane-centering as the parameter, and resulted in a success rate of 95%. By comparing the first environment information captured by the host vehicle 102 and the third environment information captured by the second member vehicle 106, the server 108 determines that the similarity score is 95%. Therefore, after applying a weighted formula to the similarity score and the success rate of the vehicular tasks performed by the first member vehicle 104 and the second member vehicle 106, the server 108 may determine that the host vehicle 102 should utilize time series analysis as the model and lane-centering as the parameter. Alternatively, the server 108 may determine that if the host vehicle 102 utilizes machine learning (artificial neural network) as the model, the host vehicle 102 should not use distance to collision as the parameter.

Figure 8:
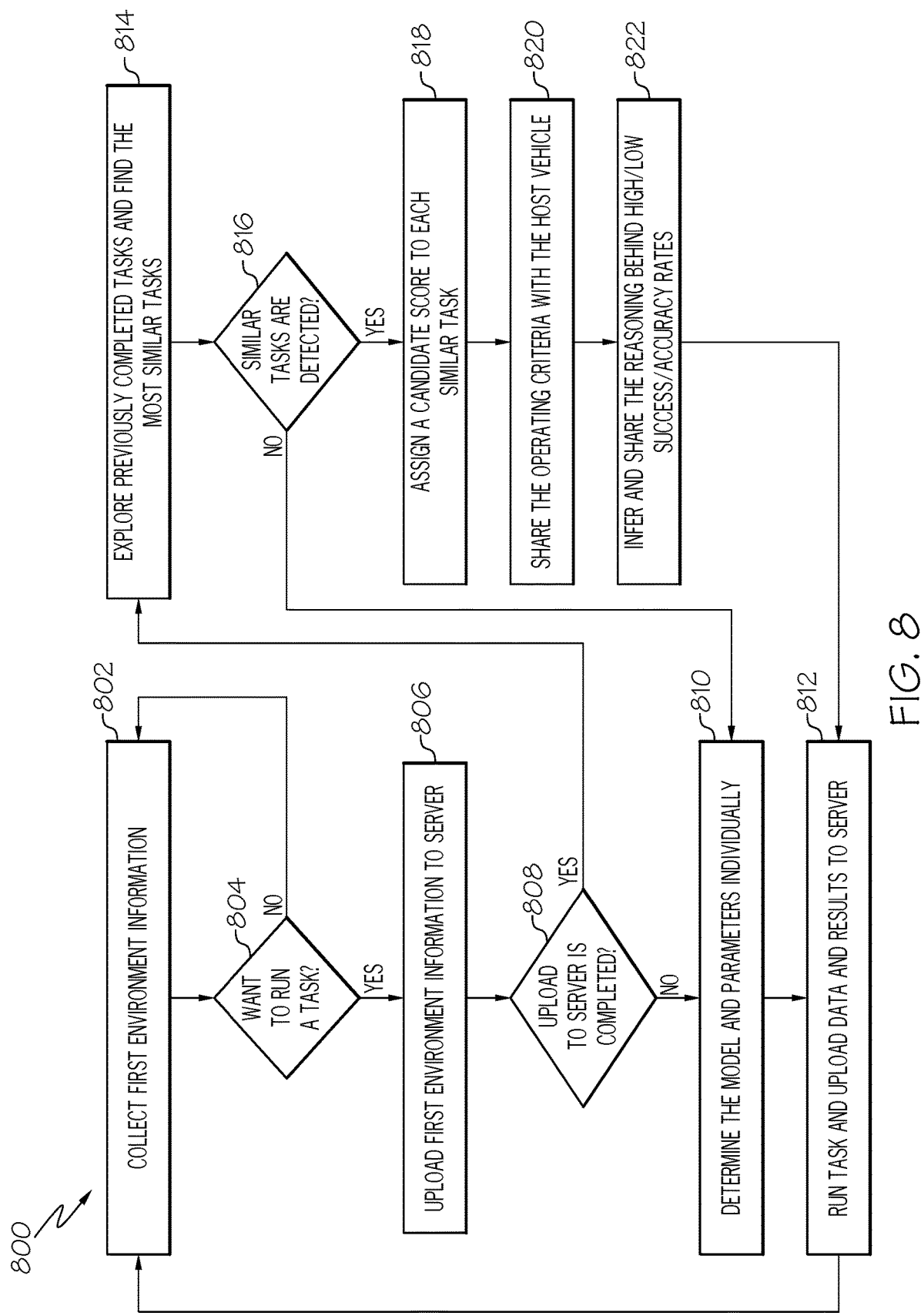
FIG. 8 schematically depicts a flowchart of a method for determining a set of operating criteria for performing a vehicular task, according to one or more embodiments shown and described herein.

FIG. 8 depicts a method 800 for determining the first set of operating criteria for performing the first vehicular task, according to one or more embodiments shown and described herein. The method 800 is described herein with reference to FIGS. 1-3 from the perspective of the host vehicle 102.

However, it should be appreciated that methods disclosed herein may be disclosed herein from the perspective of the server 108 and/or any one of the member vehicles 104, 106.

At step 802, the host vehicle 102 collects first environment information using the one or more sensors 214 of the host vehicle 102. As discussed herein, the first environment information collected by the one or more sensors 214 of the host vehicle 102 may include data exterior of the host vehicle 102, such as data pertaining to surrounding objects (e.g., other vehicles), and/or within the host vehicle 102, such as data pertaining to a driver and/or occupants of the host vehicle 102, and activity of electronic devices and network components being operated within the host vehicle 102.

At step 804, the host vehicle 102 determines that a first vehicular task is to be performed. This may be determined such as by a driver or occupant of the host vehicle 102 operating the user interface 218. If it determined at step 804 that the first vehicular task is to be performed, the method 800 proceeds to step 806 to determine the first set of operating criteria for performing the first vehicular task.

At step 806, the first vehicular task and the first environment information are processed and an attempt is made to upload the first vehicular task and the first environment information to the server 108. More particularly, processing of the first vehicular task and the first environment information by the host vehicle 102 includes determining specific information and/or knowledge data. In embodiments, the knowledge data may include a predicted outcome or predicted operating conditions for operating the host vehicle 102 when performing the first vehicular task. The first vehicular task and the first environment information, along with the specific information and/or knowledge data are then uploaded, or attempted to be uploaded, to the server 108. At step 810, it is determined whether the upload of the vehicular task is completed. In embodiments, the upload is completed when the host vehicle 102 maintains a stable or uninterrupted communication with the server 108. However, in some cases, the host vehicle 102 may not be in communication, or at least a stable and uninterrupted connection, with the server 108. In this case, the method 800 proceeds to step 810 and the host vehicle 102 determines the first set of operating criteria based on previous vehicular tasks performed by the host vehicle 102 itself that are similar to the present first vehicular task, rather than similar vehicular tasks performed by other member vehicles 104, 106. As discussed in more detail herein, the host vehicle 102 determines the first set of operating criteria by comparing the first vehicle task and the associated first environment information with the environment information captured during a previous, similar vehicular task, in this case, previously performed by the host vehicle 102.

Thereafter, at step 812, the criteria executing device 220 of the host vehicle 102 implements the first set of operating criteria to perform the first vehicular task. After the first vehicular task is completed, the host vehicle 102 uploads data, including the first environment information and the first set of operating criteria, to the server 108 to be stored in the vehicular task database 300 for purposes of being utilized for determining future sets of operating criteria. In addition, the host vehicle 102 determines and uploads results such as the success or accuracy rate of the performed first vehicular task to the server 108, particularly the vehicular task database 300. If the host vehicle 102 is still not in communication with the server 108 or maintains a stable, uninterrupted connection at the completion of the first vehicular task, the data and results are transmitted to the server 108 once the communication is re-established.

Alternatively, if the host vehicle 102 is in communication with the server 108 and the upload is completed at step 808, the method 800 proceeds to step 814 such that the first set of operating criteria may be determined based on the performance of other member vehicles, rather than previous performance of the host vehicle 102 itself. At step 814, the previously completed vehicular tasks performed by other member vehicles, such as the first member vehicle 104 and the second member vehicle 106, which are stored in the vehicular task database 300 of the server 108 are evaluated to identify one or more similar vehicular tasks. Specifically, as discussed above, the corresponding environment data of the previously performed vehicular tasks are evaluated to identify which of those vehicular tasks have a similarity score with respect to the first vehicular task to be performed by the host vehicle 102 that exceeds a threshold similarity score.

At step 816, the comparison module 302 determines whether similar vehicular tasks, i.e., vehicular tasks having a similarity score exceeding the threshold similarity score, are identified. If no similar vehicular tasks are identified by the comparison module 302, the method 800 returns to step 810 such that the host vehicle 102 identifies similar vehicular tasks internally based on its own previous performed vehicular tasks, as discussed herein at step 810.

Alternatively, if similar vehicular tasks are detected at step 816 by the comparison module 302, the vehicular tasks identified as being similar are each assigned a candidate score by the prioritization module 304 at step 818 to prioritize the vehicular tasks. As discussed herein, at step 818, the prioritization module 304 may assign a greater candidate score to the vehicular task having the greatest similarity score, the prioritization module 304 may assign a greater candidate score to the vehicular task having the greatest success or accuracy rate, or the similarity score and the success or accuracy rate may each be weighted differently to result in a candidate score that favors either a greater similarity score or a greater success or accuracy rate. The prioritization module 304 may assign candidate scores in accordance with a specific user profile.

Thereafter, at step 820, the model/parameter selection module 306 shares or otherwise transmits data pertaining to one or more of the vehicular tasks having the greatest candidate score, such as the operating criteria of that vehicular task, to the host vehicle 102 to determine the first set of operating criteria that the host vehicle 102 should utilize when executing the first vehicular task. In embodiments, the host vehicle 102 may be provided with an option to accept or deny the first set of operating criteria for performing the first vehicular task. In embodiments in which more than one sets of operating criteria are transmitted to the host vehicle 102 from the server 108, such as when more than one vehicular task has the same candidate score or a candidate score above a threshold candidate score, the host vehicle 102 may be permitted to select between the two sets of operating criteria. In addition to transmitting the one or more sets of operating criteria to the host vehicle 102, the server 108 may transmit instructions to the host vehicle 102 to avoid using a particular set of operating criteria, such as an operating criteria associated with a candidate score below a threshold candidate score. In this regard, the server 108 may analyze the information and knowledge received from vehicles to infer the reasoning behind the vehicular task success and failure, and transmit appropriate instructions based on the inferred reasoning.

In embodiments, the server 108 may be configured to infer a reasoning as to why a particular set of operating criteria had a high or low success or accuracy rate. In embodiments, this reasoning is inferred by analyzing the information and knowledge data received from the host vehicle 102, as well as the information and knowledge data received from other member vehicles. Specifically, at step 822, the server 108 may be able to utilize machine learning or extrapolate information using the vehicular tasks stored in the vehicular task database 300 to identify characteristics for particular vehicular tasks that tend to result in a higher or lower success or accuracy rate. This reasoning behind the resulting high or low success or accuracy rates can be utilized to modify the first set of operating criteria. In response to receiving the data from the server 108 at step 820, the host vehicle 102 executes the first vehicular task at step 812 utilizing the first set of operating criteria. Once the first vehicular task is completed, the host vehicle 102 identifies results of the first vehicular task, e.g., a success or an accuracy of the first vehicular task, which is transmitted to the server 108 and used to determine the success or accuracy rate associated with that vehicular task and stored within the vehicular task database 300. It should be appreciated that the vehicular knowledge networking includes the relationship between the host vehicle 102, the server 108, and the member vehicles, such as member vehicles 104, 106.

From the above, it is to be appreciated that defined herein are systems and methods for determining operating criteria for performing a vehicular task. More particularly, the methods include determining a first set of operating criteria for performing a first vehicular task based on a similarity score between first environment information captured by a host vehicle and second environment information and a success or accuracy rate of a second vehicular task performed by a member vehicle.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
receiving first environment information related to a first vehicular task from a host vehicle in communication with a server;
comparing the first environment information to second environment information received from the server and captured by a member vehicle when performing a second vehicular task corresponding to the first vehicular task using a second set of operating criteria comprising a model and a parameter, wherein the second vehicular task was performed by the member vehicle prior to the first vehicular task being performed by the host vehicle; and
determining a first set of operating criteria for performing the first vehicular task based on a similarity score between the first environment information and the second environment information, and a success or accuracy rate of the second vehicular task performed by the member vehicle based on the second set of operating criteria, the first set of operating criteria comprising a model and a parameter.

2. The method of claim 1, wherein the first set of operating criteria includes one or more of the second set of operating criteria.

3. The method of claim 1, further comprising:
comparing the first environment information to third environment information captured when another member vehicle performed a third vehicular task corresponding to the first vehicular task using a third set of operating criteria;
determining a similarity score between the first environment information and the third environment information and a success or accuracy rate of the third vehicular task performed by the another member vehicle; and
transmitting instructions for avoiding using the third set of operating criteria to the host vehicle based on the similarity score between the first environment information and the third environment information and the success or accuracy rate of the third vehicular task.

4. The method of claim 3, wherein the success or accuracy rate of the second vehicular task is greater than the success or accuracy rate of the third vehicular task.

5. The method of claim 1, wherein the first environment information includes vehicle data of surrounding vehicles captured by the host vehicle using one or more sensors.

6. The method of claim 1, further comprising determining one or more of an inference and a rationale as to a predicted success or an accuracy of the first set of operating criteria by utilizing vehicular knowledge networking.

7. The method of claim 1, further comprising:
receiving results of the first vehicular task performed by the host vehicle; and
storing the results, the results including a success or accuracy rate based on the first set of operating criteria.

8. The method of claim 1, wherein the first vehicular task is a lane change operation.

9. The method of claim 1, wherein the first vehicular task is a data download operation.

10. The method of claim 1, wherein the first vehicular task is a traffic density estimation operation.

11. The method of claim 1, wherein the first vehicular task is a driver status estimation operation.

12. A server comprising:
a controller configured to:
receive first environment information related to a first vehicular task from a host vehicle;
compare the first environment information to second environment information received at the server and captured by a member vehicle when performing a second vehicular task corresponding to the first vehicular task using a second set of operating criteria comprising at least a model and a parameter, wherein the second vehicular task was performed by the member vehicle prior to the first vehicular task being performed by the host vehicle; and
determine a first set of operating criteria for performing the first vehicular task based on a similarity score between the first environment information and the second environment information, and a success or accuracy rate of the second vehicular task performed by the member vehicle based on the second set of operating criteria, the first set of operating criteria comprising at least a model and a parameter.

13. The server of claim 12, wherein the first set of operating criteria includes one or more of the second set of operating criteria.

14. The server of claim 12, wherein the controller is configured to:

compare the first environment information to third environment information captured when another member vehicle performed a third vehicular task corresponding to the first vehicular task using a third set of operating criteria; and determine a similarity score between the first environment information and the third environment information and a success or accuracy rate of the third vehicular task performed by the another member vehicle.

15. The server of claim 14, wherein the controller is configured to:

assign a candidate score to each of the second set of operating criteria and the third set of operating criteria based on the corresponding similarity scores and the corresponding success or accuracy rates of the second set of operating criteria and the third set of operating criteria; and select one of the second set of operating criteria and the third set of operating criteria having the greatest candidate score.

16. The server of claim 14, wherein the controller is configured to:

transmit instructions for avoiding using the third set of operating criteria to the host vehicle based on the similarity score between the first environment information and the third environment information and the success or accuracy rate of the third vehicular task.

17. The server of claim 16, wherein the success or accuracy rate of the third vehicular task is below a threshold success or accuracy rate.

18. The server of claim 15, wherein the candidate score of at least one of the second set of operating criteria and the third set of operating criteria is adjusted based on one or more preferences included in a user profile of the host vehicle.

* * * * *

UNITED STATES PATENT AND TRADEMARK OFFICE
CERTIFICATE OF CORRECTION

| | | |
|---|---|---|
| PATENT NO. | : 12,223,742 B2 | Page 1 of 1 |
| APPLICATION NO. | : 17/161757 | |
| DATED | : February 11, 2025 | |
| INVENTOR(S) | : Seyhan Ucar et al. | |

It is certified that error appears in the above-identified patent and that said Letters Patent is hereby corrected as shown below:

In the Specification

In Column 3, Line(s) 36, delete "embodiment," and insert --embodiments,--, therefor.

In Column 4, Line(s) 3, after "may", insert --be--.

Signed and Sealed this
First Day of April, 2025

Coke Morgan Stewart
*Acting Director of the United States Patent and Trademark Office*